United States Patent [19]

Matsuda et al.

[11] 3,903,031

[45] Sept. 2, 1975

[54] PROCESS FOR PREPARATION OF CATIONIC POLYURETHANE EMULSIONS

[75] Inventors: Kazuo Matsuda; Hidemasa Ohmura; Hirakazu Aritaki, all of Wakayama, Japan

[73] Assignee: Kao Soap Co., Ltd., Tokyo, Japan

[22] Filed: Sept. 13, 1974

[21] Appl. No.: 505,536

[30] Foreign Application Priority Data
Sept. 18, 1973 Japan.............................. 48-105300

[52] U.S. Cl.................... 260/29.2 TN; 260/75 N; 260/77.5 AM; 260/584 R
[51] Int. Cl.²....................... C08G 18/32; C08J 3/06
[58] Field of Search.............. 260/584 R, 77.5 AM, 260/29.2 TN

[56] References Cited
UNITED STATES PATENTS

| | | | |
|---|---|---|---|
| 3,278,560 | 10/1966 | Gaertner | 260/584 R |
| 3,419,533 | 12/1968 | Dieterich | 260/29.2 TN |
| 3,479,310 | 11/1969 | Dieterich et al. | 260/29.2 TN |
| 3,491,050 | 1/1970 | Keberle et al. | 260/29.2 TN |
| 3,836,493 | 9/1974 | Matsuda et al. | 260/29.2 TN |

*Primary Examiner*—John C. Bleutge
*Assistant Examiner*—Arthur H. Koeckert
*Attorney, Agent, or Firm*—Woodhams, Blanchard and Flynn

[57] ABSTRACT

A process for the preparation of cationic polyurethane emulsions comprising chain-extending a urethane prepolymer having isocyanate groups at the ends of the molecule with a polyalkylene polyamine having at least two primary or secondary amino groups and a functional group represented by the following formula $$-CH_2-CH(OH)-CH_2X$$

wherein X is Cl or Br, to form a polyurethane-ureapolyamine, and mixing said reaction product with an aqueous solution of an acid to form a polyurethane emulsion.

9 Claims, No Drawings

PROCESS FOR PREPARATION OF CATIONIC POLYURETHANE EMULSIONS

BACKGROUND OF THE INVENTION

1. Field of the Invention

This invention relates to a process for preparing polyurethane emulsions. More particularly, this invention relates to a process for preparing homogeneous stable cationic self-emulsifiable polyurethane emulsions.

2. Description of the Prior Art

Various processes for the preparation of polyurethane emulsions have been known in the art. For example, an emulsifier-free polyurethane emulsion, namely, a so-called self-emulsifiable polyurethane emulsion, can be prepared by a process comprising reacting a polyhydroxyl compound with an excess of an organic polyisocyanate to form a urethane prepolymer having terminal isocyanate groups, chain-extending the urethane prepolymer with a tertiary amino group-containing chain extender to form a polyurethane having tertiary amino groups, and quaternizing the tertiary amino groups and mixing the reaction product with water or an aqueous solution of an acid.

According to another known process, a polyurethane composition can be dispersed in water in the presence of an emulsifier.

In general, polyurethane resins have excellent physical and chemical properties. In practical use of polyurethane emulsions, however, there is a serious problem. More specifically, the physical and chemical properties of polyurethane resin films obtained from polyurethane emulsions prepared according to conventional processes, such as those mentioned above, are greatly inferior to the physical and chemical properties of films made of cross-linked type polyurethane because it is difficult to introduce cross-linkages in the polyurethane by chemical means or because of the presence of residual emulsifier in the polyurethane resin.

In general, when a polyurethane-containing polymer having tight cross-linkages is used, handling of the polymer during the preparation steps is very difficult because the polymer is infusible and insoluble. Accordingly, it is substantially impossible to obtain an emulsion by dispersing such a polymer into water, and even if such a polyurethane polymer can be dispersed in water, in many cases the resulting emulsion is very unstable.

As an effective measure for overcoming this problem, there can be mentioned a process comprising reacting a urethane prepolymer with an excess of a polyalkylene polyamine, reacting the resulting polyurethane-urea-polyamine with an epihalohydrin, and mixing the resulting reaction product with an aqueous solution of an acid to form a polyurethane emulsion. However, in this process, since the reaction between the polyurethane-urea-polyamine and epihalohydrin is conducted in a polymeric system, the reativity of the polyurethane-urea-polyamine is low and hence, in many cases, cross-linkages are not formed at a sufficient density in the heat-treated film prepared from the emulsions prepared according to this process.

SUMMARY OF THE INVENTION

We have discovered cationic self-emulsifiable polyurethane emulsions containing a functional group having a cross-linkage-forming property.

More specifically, we have discovered that the halohydrin structure is very effective as a reactive functional group for forming cross-linkages during the heat treatment of a polyurethane resin, and that a polyalkylene polyamine having a functional group of the formula —$CH_2$—$CH(OH)$—$CH_2X$, in which X is Cl or Br, is very effective as a compound for both chain-extending a urethane prepolymer and introducing a selected amount of a halohydrin group into the resulting polymer.

In accordance with this invention, there is provided a process for preparing cationic polyurethane emulsions which comprises chain-extending a urethane prepolymer having terminal isocyanate groups, which is prepared from a polyhydroxyl compound and an excess of a polyisocyanate, with a polyalkylene polyamine having a functional group represented by the formula —$CH_2$—$CH(OH)$—$CH_2X$, in which X is Cl or Br, thereby to form a polyurethane-urea-polyamine, and mixing the resulting reaction product with an aqueous solution of an acid to form a cationic self-emulsifiable polyurethane emulsion. The resin component in the thus-formed polyurethane emulsion either has no cross-linkages or it has only a very small number of cross-linkages. When a polyurethane resin film obtained by drying this polyurethane emulsion is heat-treated, tough cross-linkages are formed and the physical and chemical properties of the polyurethane resin are highly improved. This specific property of the polyurethane emulsion, according to the invention, is one of prominent advantages of this invention.

The polyalkylene polyamine having a functional group of the formula —$CH_2$—$CH(OH)$—$CH_2X$, in which X is Cl or Br, which is used in this invention as a chain extender for a urethane prepolymer, is a reaction product obtained by reacting a polyalkylene polyamine with an epihalohydrin such as epichlorohydrin and epibromohydrin. It has the following formula (1)

$$R—A—CH_2—CH—CH_2X \qquad (1)$$
$$\phantom{R—A—CH_2—C}|$$
$$\phantom{R—A—CH_2—CH—}OH$$

wherein X is Cl or Br, A is a secondary or tertiary amino group and R is an alkylene group having at least one primary or secondary amino group, with the proviso that the compound represented by the general formula includes at least two primary or secondary amino groups.

Accordingly, a polyurethane-urea-polymaine obtained by chain-extending a urethane prepolymer with a chain extender having the general formula (1) contains a halohydrin structure in the molecule. Because of the presence of this halohydrin structure, tough cross-linkages are formed when a film of the resulting emulsion is heated.

The polyurethane-urea-polyamine used in this invention is obtained by reacting a urethane prepolymer having terminal isocyanate groups, which is derived from a polyhydroxyl compound and an excess of a polyfunctional isocyanate, with a chain extender of the formula (1) preferably in a ketone type solvent, such as acetone or methyl ethyl ketone.

As the polyfunctional isocyanate, there can be employed, for example, aromatic, aliphatic and alicyclic diisocyanates such as 1,5-naphthylene diisocyanate, 4,4'-diphenylmethane diisocyanate, 4,4'-diphenyldimethylmethane diisocyanate, di- and tetra-alkyldiphenylmethane diisocyanates, 4,4'-dibenzyl diisocyanate, 1,3-phenylene diisocyanate, 1,4-phenylene diisocyanate and tolylene diisocyanates, chlorinated isocyanates, brominated isocyanates, phosphorus-containing isocyanates, 1,4-butylene diisocyanate, 1,6-hexamethylene diisocyanate, lysine diisocyanate, dicyclohexylmethane diisocyanate, cyclohexane-1,4-diisocyanate, xylene diisocyanate, and the like. Further, it is possible to employ triisocyanates such as 1-methylbenzol-2,4,6-triisocyanate, biphenyl-2,4,4'-triisocyanate and triphenylmethane triisocyante in combination with the above-mentioned diisocyanates.

The polyhydroxyl compounds used in the preparation of a urethane prepolymer to be used in the process of this invention are those having molecular weight of 200 to 10,000. Any of the known polyhydroxyl compounds customarily used for preparation of polyurethanes, such as polyethers, polyesters, polyester amides, polyacetals, polythioethers, polybutadieneglycols and the like can be used in this invention.

As the polyether, there can be mentioned, for example, cyclic ethers such as those obtained by the ring-opening polymerization or copolymerization of ethylene oxide, propylene oxide, butylene oxide, tetrahydrofuran and the like, and graft copolymers thereof.

Further, homogeneous polyethers or mixed polyethers formed by condensation of, for example, hexanediol, methylhexanediol, heptanediol and octanediol can be employed. It is also possible to use propoxylated and ethoxylated glycols.

As typical examples of the polyester, there can be mentioned polyester glycols obtained by dehydrating condensation of dibasic acids and saturated or unsaturated low-molecular-weight glycols such as ethyleneglycol, propyleneglycol, 1,3-butanediol, 1,4-butanediol, neopentylglycol, pentanediol, hexanediol, octanediol, 2-ethyl-1,3-hexanediol, 1,4-butynediol, bisphenol A, diethyleneglycol, dipropyleneglycol and the like, and polyester glycols obtained by ring-opening polymerization of cyclic ester compounds.

As the polythioether, there are preferably employed homopolycondensation products of thioglycols and copolycondensation products of thioglycols with other glycols.

As the polyacetal, there can be mentioned, for example, water-insoluble polyacetals derived from hexanediol or 4,4'-dioxyethoxydiphenylmethane and formaldehyde.

Glycols customarily used together with the above polyhydroxyl compounds, such as ethyleneglycol, diethyleneglycol, triethyleneglycol, butanediol, propanediol, 1,6-hexanediol, neopentylglycol and N-alkyldiethanol amines having an alkyl group of one to 22 carbon atoms can be used in combination with the polyols if necessary.

As the polyalkylene polyamines used in the process of this invention, there can be used various polyalkylene polyamines such as polyethylene polyamine, polypropylene polyamine, polybutylene polyamine and the like in this invention.

More particularly, the polyalkylene polyamine used in this invention are polyamines containing in the molecule from 2 to about 4 connecting units having the formula $-C_nH_{2n}-$, wherein $n$ is an integer larger than one, usually from 2 to 6. The connecting units connect together the nitrogen atoms. The nitrogen atoms may be bound to adjacent carbon atoms in the $-C_nH_{2n}-$ unit, but they may not be bound to the same carbon atom.

The polyamines have the formula

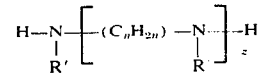

wherein $n$ is as defined above, $z$ is an integer from 2 to 4, and R', which can be the same or different, are hydrogen, alkyl having one to four carbon atoms, or hydroxyalkyl having one to four carbon atoms.

More specifically, there can be used not only such polyamines as diethylene triamine, triethylene tetramine, tetraethylene pentamine and dipropylene triamine but also mixtures and various crude products containing these polyamines.

It is also possible to use hydroxylalkyl-substituted polyamines in combination with the foregoing polyamines.

In some cases, in order to change the density of hydrophilic groups in the polyurethane emulsion obtained according to this invention or to improve the properties of the films made from the emulsion, it is preferred to change or increase the distance between the active hydrogen-containing amino groups in the polyurethane-urea-polyamine molecule. This can be accomplished by substituting a part of the polyalkylene polyamine, with ethylene diamine, propylene diamine, hexamethylene diamine, piperazine, phenylene diamine, a substitution product of such diamine with a saturated alkyl group of one to 22 carbon atoms, or an alkyleneoxide adduct, acrylonitrile adduct or acrylate adduct of such diamine. In general, the foregoing object can be achieved by replacing up to about 50 molar percent of the polyalkylene polyamine by the diamine.

As the epihalohydrin to be used for preparing the chain extender of the formula (1) by reaction with the above polyalkylene polyamine, epichlorohydrin and epibromohydrin are effectively used, but epichlorohydrin is preferred. The polyalkylene polyamine used is selected so that the chain extender of the formula (1) contains at least two amino groups and at least two of the amino groups contained are primary or secondary amino groups.

When the polyalkylene polyamine is reacted with the epihalohydrin to form a chain extender of the formula (1), it is preferred that both are reacted in the presence of an inert organic solvent, such as benzene.

In the reaction between the polyalkylene polyamine and epihalohydrin, the ratio of the two reactants differs depending on the number of amino groups contained in one molecule of the polyalkylene polyamine, but this ratio should be selected so that at least two primary or secondary amino groups are contained in one molecule of the product of the formula (1).

This reaction is generally conducted at a temperature of 10° to 80°C. When the reaction is carried out at too high a temperature, the product becomes resinous.

The reaction time varies depending on the reaction temperature and the kind of polyalkylene polyamine used, but it is generally preferred that the reaction is conducted for 0.5 to 5 hours.

Preparation of the isocyanate-terminated urethane prepolymer used in this invention is carried out in the presence of an inert solvent, such as benzene, or without a solvent.

When an aromatic polyisocyanate is used with the polyhydroxyl compound, a reaction temperature of 50° to 100°C is used, and when an aliphatic or alicyclic polyisocyanate is employed, a reaction temperature of 70° to 130°C is adopted.

In the preparation of the urethane prepolymer, it is preferred that the amount of the polyisocyanate is selected so that all of the hydroxyl groups are reacted with the isocyanate groups of the polyisocyanate.

More specifically, it is preferred that the ratio of the total mole number of the —NCO groups to the total mole number of the reactive hydrogen atoms (—OH groups) is within the range of from 1.1 : 1.0 to 5.0 : 1.0.

The reaction between the isocyanate-terminated urethane prepolymer and the chain extender of the formula (1) is preferably conducted under atmospheric pressure at a temperature ranging from −20° to +70°C in a ketone type solvent.

As the ketone type solvent, there can be employed, for example, acetone, methylethylketone, diethylketone, dipropylketone, methylisobutylketone and methylisopropylketone. Use of acetone and methylethylketone is especially preferred.

It is possible to employ a mixed solvent of a ketone type solvent with benzene, tetrahydrofuran, dioxane, an acetic acid ester, dimethylformamide or a chlorinated solvent.

The reaction time varies depending on the reaction temperature and the reactivity of the polyisocyanate compound used. A shorter or longer reaction time is adopted depending on the reaction conditions. The reaction is continued until the absorption at 2,250 cm$^{-1}$ owing to the —NCO group disappears in the infrared absorption spectrum measured on samples of the reaction mixture taken during the reaction. In general, the reaction is carried out for 0.5 to 2 hours.

In the reaction of the isocyanate groups at both ends of the urethane prepolymer molecule with the chain extender of the formula (1), it is critical that the total mole number of the primary and secondary amino groups is greater than the total mole number of the isocyanate groups. As the total mole number of the amino groups becomes close to the total mole number of the isocyanate groups, the molecular weight of the resulting polyurethane-urea-polyamine becomes great, and a gelled product or a product having a great tendency to become gelated is formed. If the mole number ratio of the amino groups to the isocyanate groups is too high, the molecular weight of the resulting polyurethane-urea-polyamine becomes small, and if such a low-molecular-weight polyurethane-urea-polyamine is used as an intermediate for preparing the polyurethane emulsion it is impossible to obtain a resinous product of excellent physical properties from such emulsion.

It is preferred that the ratio of the number (B) of moles of active hydrogen-containing amino groups in the chain extender of the formula (1) to the number (A) of moles of isocyanate groups in the isocyanate-terminated urethane prepolymer is within the range of $1 < B/A \leq 5$, especially $1 < B/A \leq 3$. It is preferred that the polyurethane-urea-polyamine has a molecular weight of 5,000 to 100,000.

In the chain extender of the formula (1) there are present hydroxyl groups capable of reacting with isocyanate groups, but the reaction between the hydroxyl and isocyanate groups does not substantially proceed, because the rate of the reaction between primary or secondary amino groups and the isocyanate groups is much higher than the rate of the reaction between the hydroxyl groups and the isocyanate groups and because the number of primary and secondary amino groups is greater than the number of isocyanate groups. Accordingly, the hydroxyl groups contained in the chain extender are left substantially unreacted and they are connected to the resulting polyurethane-urea-polyamine in the free state (—OH).

The thus-formed polyurethane-urea-polyamine is mixed with an aqueous solution of an acid. Thus there is obtained a cationic self-emulsifiable polyurethane emulsion.

The organic solvent used for the reaction can be distilled off under heating, and the stability of the emulsion is not at all degraded by distillation of the solvent.

Aqueous solutions of any water-soluble inorganic acids and organic acids can be used in the process of this invention. It is preferred to use aqueous solutions of monobasic acids, especially hydrochloric acid, nitric acid, acetic acid, propionic acid, monochloroacetic acid and glycolic acid. The amount of the aqueous solution of the acid added to the polyurethane-urea-polyamine is such an amount that the pH of polyurethane-urea-polyamine emulsion be kept within the range of about 5 to about 7.

The polyurethane emulsion prepared according to the process of this invention is a so-called self-emulsifiable emulsion free of an emulsifier. But in order to improve the stability of the emulsion, it is permissible to add a known emulsifier in such an amount as will not drastically change the properties of the polyurethane resin.

According to the foregoing process, according to the invention, there can be obtained a low viscosity emulsion having ordinarily a resin content of 5 to 50 weight percent. The most prominent advantage of this invention is that the polyurethane resin contained in the thus-formed emulsion contains a reactive group —CH$_2$—CH(OH)—CH$_2$X, in which X is Cl or Br, which can form cross-linkages under heating.

When the polyurethane emulsion prepared according to this invention is impregnated into fibrous materials, nonwoven fabrics, paper, leather, rubber, wood, metals, glass or plastics or is coated or sprayed on surfaces of these substrates and then the emulsion is dried, films having improved touch and surface coatings of improved properties can be obtained. Further, the emulsion prepared according to the process of this invention can be used in the fields of civil engineering and construction and also as an adhesive or the like.

This invention will now be further described in detail by reference to the following illustrative Examples which by no means limit the scope of this invention.

In the Examples, all references to "parts" and "percent" are on a weight basis unless otherwise indicated.

Example 1

First, 61.8 parts of diethylene triamine (0.6 mole) were dissolved in 61.8 parts of methylethylketone, and the solution was charged into a round-bottom flask equipped with a thermometer and an agitator and was agitated at 25°–30°C for 30 minutes. A solution formed by dissolving 18.5 parts of epichlorohydrin (0.2 mole) in 18.5 parts of methylethylketone was added dropwise to the above solution over a period of 15 minutes at 30° to 45°C, and the mixture was reacted at 45°C for 1.5 hours to obtain a solution of a chain extender which contained no epoxide group, but which contained covalently bonded chlorine.

Then, 8.11 parts of the reaction mixture (0.0303 mole of the chain extender) were dissolved in 200 parts of methylethylketone, and the solution was charged into a round-bottom flask equipped with a thermometer and an agitator and agitated at 30°C for 1 hour.

Separately, 327 parts of polytetramethylene ether glycol (OH value = 54.9) dehydrated at 100°C under 20 mm Hg for 1 hour, 164 parts of methylethylketone and 55.7 parts of a tolylene diisocyanate isomeric mixture of a 2,4-/2,6- mole ratio of 80/20 were charged in a flask equipped with a thermometer and an agitator, and the mixture was agitated at 80°C for 3 hours to effect reaction. Then, the reaction mixture was cooled. Thus there was obtained an isocyanate-terminated urethane prepolymer in which the residual isocyanate group content was 2.43 percent.

89 parts of the thus-formed urethane prepolymer solution was added to the chain extender solution in the round-bottom flask over a period of 30 minutes at a temperature maintained at 30°C thereby to form a polyurethane-urea-polyamine solution.

A small amount of a sample was collected from the resulting polymer solution, and it was subjected to infrared absorption spectrum analysis. It was confirmed that no absorption owing to the —NCO group was present at 2,250 cm$^{-1}$.

A solution formed by dissolving 4.3 parts of 70 percent aqueous glycolic acid in 300 parts of water was added to the above polyurethane-urea-polyamine solution, and then methylethylketone used as the solvent was distilled off under reduced pressure and water was added to adjust the concentration. Thus there was obtained a stable emulsion having a resin content of 20.0 percent.

This emulsion was cast and air-dried to obtain a transparent flexible film. When this film was heat-treated at 120°C for 20 minutes, a film having the following properties was obtained:

| | |
|---|---|
| 100 percent modulus | 20 Kg/cm$^2$ |
| 300 percent modulus | 28 Kg/cm$^2$ |
| Tensile strength | 320 Kg/cm$^2$ |
| Elongation | 640 percent |

COMPARATIVE EXAMPLE 1

89 parts of the urethane prepolymer solution obtained in Example 1 was added dropwise to a solution of 3.12 parts (0.0303 mole) of diethylene triamine in 200 parts of methylethylketone over a period of 30 minutes at a temperature maintained at 30°C to effect a reaction. Then, 3.64 parts of epichlorohydrin was added and the reaction was further conducted at 50°C for 1 hours.

A solution formed by dissolving 4.3 parts of 70 percent aqueous glycolic acid in 300 parts of water was added to the resulting reaction mixture, and then methylethylketone used as the solvent was distilled off at 40° to 50°C under reduced pressure. The concentration was adjusted by addition of water. Thus there was obtained a stable emulsion having a resin content of 20.0 percent.

The mechanical properties of a film obtained from this emulsion heat-treated in the same manner as described in Example 1 were as follows:

| | |
|---|---|
| 100 percent modulus | 18 Kg/cm$^2$ |
| 300 percent modulus | 22 Kg/cm$^2$ |
| Tensile strength | 168 Kg/cm$^2$ |
| Elongation | 600 percent |

When Example 1 (process of this invention) is compared with Comparative Example 1, it will readily be understood that the film formed from the polyurethane emulsion prepared according to the process of this invention had unexpectedly improved mechanical properties.

EXAMPLE 2

A mixture of 195.5 parts of dehydrated polytetramethylene ether glycol (OH value = 114.8), 113.6 parts of methylethylketone and 69.6 parts of a tolylene diisocyanate mixture of a 2,4-/2,6- mole ratio of 80/20 was reacted in the same manner as described in Example 1 to obtain a solution of a urethane prepolymer having a terminal isocyanate group content of 4.32 percent.

Separately, a solution formed by dissolving 103 parts (1.0 mole) of diethylene triamine in methylethylketone was charged into a round-bottom flask, and it was treated with a solution formed by dissolving 46.3 parts (0.5 mole) of epichlorohydrin in methyethylketone and reacted in the same manner as described in Example 1 to obtain a reaction mixture of a chain extender free of epoxide groups (concentration of 50 percent). Then, 18.06 parts of the reaction mixyure (containing 0.0605 mole of the chain extender) was dissolved in 200 parts of methylethylketone, and 100 parts of the above urethane prepolymer solution (isocyanate content of 4.32 percent) was gradually added to the resulting solution over a period of 10 minutes and the mixture was agitated to effect a reaction and obtain a solution of a polyurethane-urea-polyamine.

Then, 7.5 parts of 70 percent aqueous glycolic acid and 300 parts of water were added to 278 parts of the thus-prepared polyurethane-urea-polyamine solution, and methylethylketone was distilled off under reduced pressure to obtain a stable emulsion having a resin content of 22.4 percent.

A film prepared from this emulsion and heat-treated in the same manner as described in Example 1 had the following mechanical properties:

| | |
|---|---|
| 100 percent modulus | 19 Kg/cm$^2$ |
| 300 percent modulus | 38 Kg/cm$^2$ |
| Tensile strength | 212 Kg/cm$^2$ |
| Elongation | 580 percent |

COMPARATIVE EXAMPLE 2

100 parts of the urethane prepolymer solution obtained in Example 2 was added dropwise to a mixture of 6.23 parts (0.0605 mole) of diethylene triamine and 200 parts of methylethylketone over a period of 20 minutes in the same manner as in Comparative Example 1, and 7.28 parts of epichlorohydrin was added to the reaction mixture and the reaction was further conducted at 50°C for 1 hour.

Then, 300 parts of water and 8.54 parts of a 70 percent aqueous solution of glycolic acid were added to the reaction mixture, and methylethylketone was distilled off under reduced pressure to obtain a stable emulsion having a resin content of 30 percent.

A film prepared from this emulsion and heat-treated in the same manner as described in Example 1 had the following mechanical properties:

| 100 percent modulus | 15 Kg/cm² |
| 300 percent modulus | 32 Kg/cm² |
| Tensile strength | 132 Kg/cm² |
| Elongation | 600 percent |

When Example 2 (process of this invention) is compared with Comparative Example 2, it will readily be understood that the film obtained from the emulsion prepared according to the process of this invention had unexpectedly improved mechanical properties.

Example 3

293.1 parts of dehydrated polytetramethylene ether glycol (OH value of 53.6), 125.6 parts of dehydrated polyoxypropylene glycol (OH value of 55.2), 216.7 parts of benzene and 87.0 parts of a tolylene diisocyanate isomeric mixture of a 2,4-/2,6- molar ratio of 80/20 were charged into a flask equipped with an agitator and a thermometer, and the mixture was reacted at 80°C for 3 hours to form a solution of an isocyanate-terminated urethane prepolymer. The residual isocyanate group content was found to be 3.37 percent.

Separately, a reaction mixture having a concentration of 50 percent (methylethylketone solution) was prepared from 51.5 parts (0.5 mole) of diethylene triamine and 46.3 parts (0.5 mole) of epichlorohydrin in the same maner as in Example 1, and 17.4 parts of the thus-obtained mixture was dissolved in 200 parts of methylethylketone. Then, 100 parts of the above urethane prepolymer solution (isocyanate content of 3.37 percent) was added dropwise to the thus-formed chain extender solution at a temperature of 26° to 30°C over a period of 10 minutes to effect reaction. Then, 5.2 parts of 70 percent aqueous glycolic acid and 290 parts of water were added to 280 parts of the reaction mixture, and methylethylketone and benzene were distilled off under reduced pressure to obtain an emulsion having a resin content of 30 percent.

A film prepared from this emulsion and heat-treated in the same manner as described in Example 1 had the following properties:

| 100 percent modulus | 13 Kg/cm² |
| 300 percent modulus | 18 Kg/cm² |
| Tensile strength | 208 Kg/cm² |
| Elongation | 780 percent |

EXAMPLE 4

510.0 parts of dehydrated polyoxypropylene glycol (OH value = 110.0) and 174.0 parts of a tolylene diisocyanate isomeric mixture of a 2,4-/2,6- molar ratio of 80/20 were charged in a round-bottom flask equipped with a thermometer and an agitator, and the mixture was well blended and reacted at 90°C for 2.5 hours to form an isocyanate-terminated urethane prepolymer.

In this urethane prepolymer the residual isocyanate group content was found to be 5.87 percent.

Separately, a chain extender solution of a 50 percent concentration (methylethylketone solution) was prepared from 61.8 parts (0.6 mole) of diethylene triamine and 55.5 parts (0.6 mole) of epichlorohydrin in the same manner as in Example 1, and 17.7 parts of the solution was mixed with 3.9 parts of piperazine and the mixture was diluted with 400 parts of methylethylketone. Then, 110 parts of the above prepolymer solution diluted with 102 parts of methylethylketone was added dropwise to the above dilution of chain extender at 30° to 31°C over a period of 10 minutes to effect a reaction. Then, 610 parts of the resulting polymer solution was incorporated with 6.2 parts of 70 percent aqueous glycolic acid and 485 parts of water, and methylethylketone was distilled off under reduced pressure to obtain an emulsion of a resin content of 22 percent.

A film prepared from this emulsion and heat-treated in the same manner as described in Example 1 had the following mechanical properties:

| 100 percent modulus | 9 Kg/cm² |
| 300 percent modulus | 16 Kg/cm² |
| Tensile strength | 168 Kg/cm² |
| Elongation | 570 percent |

EXAMPLE 5

245.2 parts of poly-(1,4-butylene-ethylene adipate)-glycol (OH value of 54.9)synethesized from an equimolar mixture of 1,4-butanediol, ethyleneglycol and adipic acid by dehydrating condensation, 123 parts of methylethylketone and 41.8 parts of a tolylene diisocyanate isomeric mixture of a 2,4-/2,6- molar ratio of 80/20 were mixed and reacted at 80°C for 3 hours to obtain a solution of an isocyanate-terminated urethane prepolymer having an isocyanate group content of 2.36 percent.

100 parts of the thus-formed urethane prepolymer solution was added dropwise to a solution formed by diluting 9.9 parts of the chain extender solution obtained in Example 2 (methylethylketone solution of a concentration of 50 percent) with 200 parts of methylethylketone to thereby effect a reaction. 4.4 parts of 70 percent aqueous glycolic acid and 296 parts of water were added to 293 parts of the resulting polymer solution, and methylethylketone was distilled off under reduced pressure to obtain a homogeneous stable emulsion of a resin content of 25 percent.

The thus-obtained emulsion was diluted with water at various ratios, and each of the diluted emulsions was homogeneous and stable.

A film prepared from this emulsion and heat-treated in the same manner as in Example 1 had the following mechanical properties:

| 100 percent modulus | 9 Kg/cm² |
| 300 percent modulus | 17 Kg/cm² |
| Tensile strength | 194 Kg/cm² |
| Elongation | 1060 percent |

EXAMPLE 6

2.4 parts of acetic acid was employed instead of 4.3 parts of 70 per cent aqueous glycolic acid employed in the Example 1 and a stable emulsion containing 20.0 per cent of resin was obtained in the same manner as in Example 1. A film prepared from this emulsion and heat-treated in the same manner as in Example 1 had the following mechanical properties:

| | |
|---|---|
| 100 percent modulus | 18 Kg/cm² |
| 300 percent modulus | 25 Kg/cm² |
| Tensile strength | 309 Kg/cm² |
| Elongation | 690 percent |

EXAMPLE 7

7.2 parts of 35 per cent aqueous hydrochloric acid was employed instead of 7.5 parts of 70 per cent aqueous glycolic acid employed in the Example 2 and a stable emulsion containing 21.0 per cent of resin in the same manner as Example 1. A film prepared from this emulsion and heat-treated in the same manner as in Example 2 had the following mechanical properties:

| | |
|---|---|
| 100 percent modulus | 20 Kg/cm² |
| 300 percent modulus | 41 Kg/cm² |
| Tensile strength | 220 Kg/cm² |
| Elongation | 570 percent |

EXAMPLE 8

18.0 parts of 20 per cent aqueous nitric acid was employed instead of 6.2 parts of 70 per cent aqueous glycolic acid employed in Example 4 and a stable emulsion containing 20 per cent of resin in the same manner as in Example 4. A film prepared from this emulsion had the following mechanical properties:

| | |
|---|---|
| 100 percent modulus | 8 Kg/cm² |
| 300 percent modulus | 15 Kg/cm² |
| Tensile strength | 157 Kg/cm² |
| Elongation | 610 percent |

An embodiment of the invention in which an exclusive property or privilege is claimed are defined as follows:

1. A process for preparing a cationic polyurethane emulsion, which comprises:
   1. reacting, in the liquid phase and in a ketone solvent at a temperature of from −20° to +70°C, (A) isocyanate-terminated urethane prepolymer prepared by reacting organic polyol having a molecular weight in the range of from 200 to 10,000 with an excess of organic polyisocyanate, with (B) an excess of polyalkylene polyamine having at least two primary or secondary amino groups and also having a functional group of the formula —CH₂—CH(OH)—CH₂X, wherein X is chloro or bromo, the total mole number of primary and secondary amino groups in the polyalkylene polymaine being greater than the total mole number of isocyanate groups in the isocyanate-terminated urethane prepolymer, the reaction being carried out until the presence of —NCO groups cannot be detected, whereby to form polyurethane-ureapolyamine, and
   2. adding to the reaction product of step 1 an aqueous solution of an acid to form an emulsion, the amount of which is such an amount that the pH of polyurethane-urea-polyamine emulsion be kept within the range of about 5 to about 7.
   3. treating the product of step 2 to remove the organic solvent therefrom and thereby obtaining an aqueous cationic polyurethane emulsion as a final product.

2. A process according to claim 1, in which the reactant (B) includes up to 50 percent, by molecular equivalent, of diamines or alkylene oxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is in the range of $1 < (b/a) \leq 5$.

4. A process according to claim 1, in which the polyalkylene polyamine has the formula

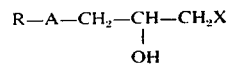

wherein X is Cl or Br, A is a secondary or tertiary amino group and R is alkylene having at least one primary or secondary amino group, provided that the sum of the primary and secondary amino groups in the polyalkylene polyamine is at least two.

5. A process according to claim 4, in which said polyalkylene polyamine is prepared by reacting, at from 10° to 80°C, for from 0.5 to 5 hours, epichlorohydrin or epibromohydrin with a polyamine having the formula

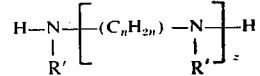

wherein $n$ is an integer larger than one, $z$ is an integer from 2 to 4 and R' is hydrogen, alkyl having one to four carbon atoms or hydroxyalkyl having one to four carbon atoms.

6. A process according to claim 1, in which said acid is selected from the group consisting of hydrochloric acid, nitric acid, acetic acid, propionic acid, monochloroacetic acid and glycolic acid.

7. A process according to claim 1, in which said acid is glycolic acid.

8. An aqueous cationic polyurethane emulsion prepared by the process of claim 1.

9. A polyurethane molded product prepared by forming the emulsion of claim 8 into a molded product and then heat-treating the product to effect cross-linking.

* * * * *